United States Patent [19]

Mizote et al.

[11] 4,291,373
[45] Sep. 22, 1981

[54] NAVIGATIONAL INFORMATION ANNOUNCING SYSTEM FOR MOTOR VEHICLE

[75] Inventors: Masanori Mizote, Yokosuka; Kiyoshi Yamaki, Yokohama; Takashi Oka, Tokyo; Hideoki Matsuoka, Yokohama; Hiroyuki Nomura, Yokohama; Takaaki Mogi, Yokohama, all of Japan

[73] Assignee: Nissan Motor Company, Limited, Yokohama, Japan

[21] Appl. No.: 4,992

[22] Filed: Jan. 19, 1979

[30] Foreign Application Priority Data

Jan. 20, 1978 [JP] Japan ................... 53-5619

[51] Int. Cl.³ .............. G06F 15/50; G08G 1/12; G11B 5/00
[52] U.S. Cl. ............................ 364/443; 340/23; 340/52 R; 364/436; 360/72.1; 369/21; 369/22
[58] Field of Search .............. 364/424, 436, 443, 561; 340/23, 24, 52; 179/100.1 C

[56] References Cited

U.S. PATENT DOCUMENTS

| 2,501,048 | 3/1950 | Haller | 340/52 R |
| 3,845,289 | 10/1974 | French | 364/436 |
| 3,925,641 | 12/1975 | Kashio | 364/436 |
| 4,028,531 | 6/1977 | Cottin et al. | 340/24 |
| 4,190,819 | 2/1980 | Burgyan | 179/100.1 C |

FOREIGN PATENT DOCUMENTS

| 2700930 | 7/1978 | Fed. Rep. of Germany | 340/24 |
| 1113522 | 5/1968 | United Kingdom | 340/23 |
| 1209652 | 10/1970 | United Kingdom | 340/23 |
| 1227531 | 4/1971 | United Kingdom | 340/23 |
| 1294811 | 11/1972 | United Kingdom | 340/23 |
| 1396614 | 6/1975 | United Kingdom | 340/23 |
| 1414490 | 11/1975 | United Kingdom | 340/23 |

*Primary Examiner*—Felix D. Gruber
*Attorney, Agent, or Firm*—Lowe, King, Price & Becker

[57] ABSTRACT

A navigation information announcing system for a motor vehicle comprises a tape player, circuitry for measuring the distance actually travelled by the vehicle, circuitry for reproducing distance information prerecorded on a magnetic tape, and a comparator. A distance indicated by a reproduced datum from a magnetic tape is compared with the distance actually travelled so that the tape player performs a pause operation until the two distances equal each other. When these distances equal each other, the normal playback operation is reestablished so as to reproduce oral information prerecorded on the magnetic tape, supplying the vehicle driver with directional information.

8 Claims, 10 Drawing Figures

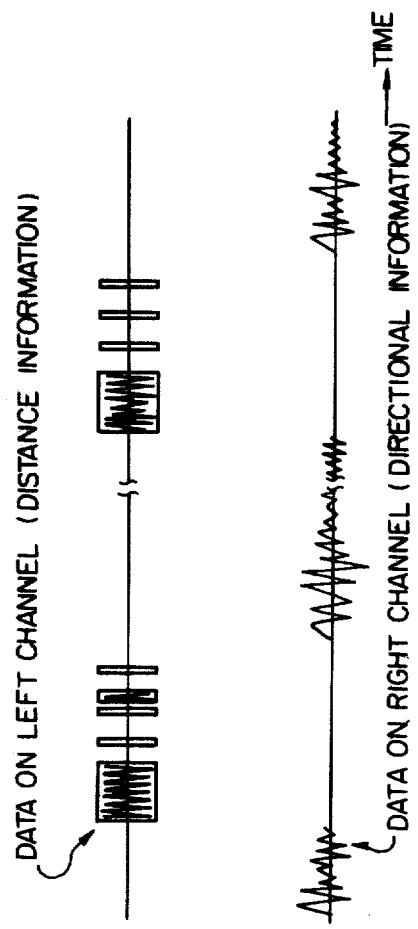

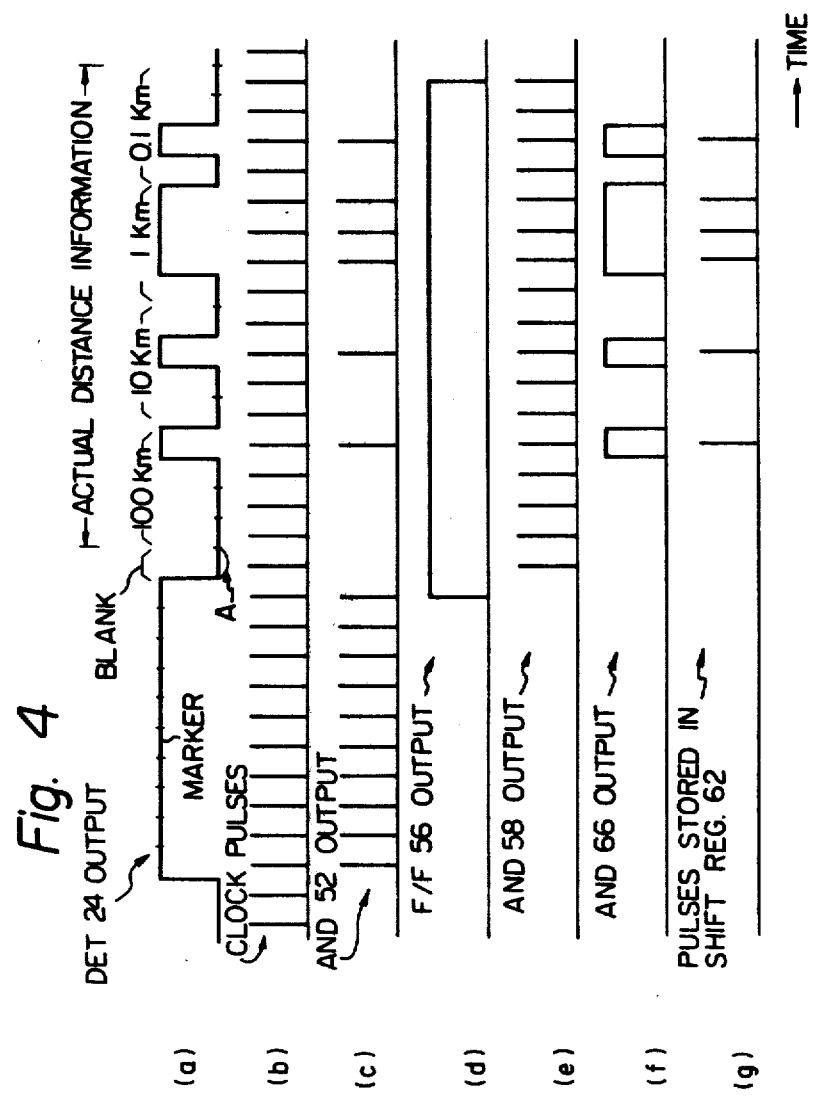

NAVIGATIONAL INFORMATION ANNOUNCING SYSTEM FOR MOTOR VEHICLE

FIELD OF THE INVENTION

This invention generally relates to an indicator for a motor vehicle. More particularly, the present invention relates to a navigational information supplying system, which supplies the vehicle driver with driving instructions and/or other information.

BACKGROUND OF THE INVENTION

Motor vehicles are usually equipped with trip meters which indicate the distance travelled by the motor vehicle. Generally conventional trip meters are of the mechanical type. In such trip meters a mechanical counter including a numerical display device is driven via reduction gears by a drive shaft operatively connected to the transmission or other mechanism of the vehicle. When the driver of the vehicle intends to measure a distance between two points, the driver resets the trip meter to zero so that the trip meter will count over the distance travelled, from zero.

When a vehicle is driven along an unfamiliar course, it is advantageous for the vehicle driver to memorize each distance indicated by the trip meter, at each point where a turn is made, for the next time trip along the same route. It is more preferable to memorize a feature of each intersection where a turn is made in addition to the distances as far as the intersections. However, when numerous turns are made along a course, it is almost impossible to memorize all of the distances and/or the features of the points at which turns are made.

SUMMARY OF THE INVENTION

The present invention has been developed to eliminate the above mentioned inconvenience in a next trip along the same course travelled once.

It is therefore, an object of the present invention to provide a navigational information announcing system for supplying a driver of a motor vehicle with driving instructions of a trip along a predetermined course.

In accordance with the present invention, distance information and audio information which contains navigational information are alternately reproduced from a magnetic tape. The distance information reproduced from the tape is used to determine whether the vehicle has travelled a predetermined reference distance corresponding to distance between a starting point and a predetermined point along the predetermined course, by comparing the same with a measured distance actually travelled by the vehicle. When the vehicle has travelled the predetermined distance, the audio information is announced to supply the vehicle driver with navigational information such as directional instructions. A plurality of pieces of audio information is prerecorded on a magnetic tape so that each piece of information is reproduced at each point where information is required by the vehicle driver, along the predetermined course.

BRIEF DESCRIPTION OF THE DRAWINGS

The above described object and other objects and features of the present invention will become more readily apparent from the following detailed description of the preferred embodiment of the navigational information announcing system taken in conjunction with the accompanying drawings in which:

FIG. 3 is a time chart showing two data signals prerecorded on the magnetic tape shown in FIG. 1; and FIG. 4, including a-g, is a time chart showing various signals derived in the series-parallel converter shown in FIG. 2.

DETAILED DESCRIPTION OF THE PREFERRED EMBODIMENT

Figure 1:
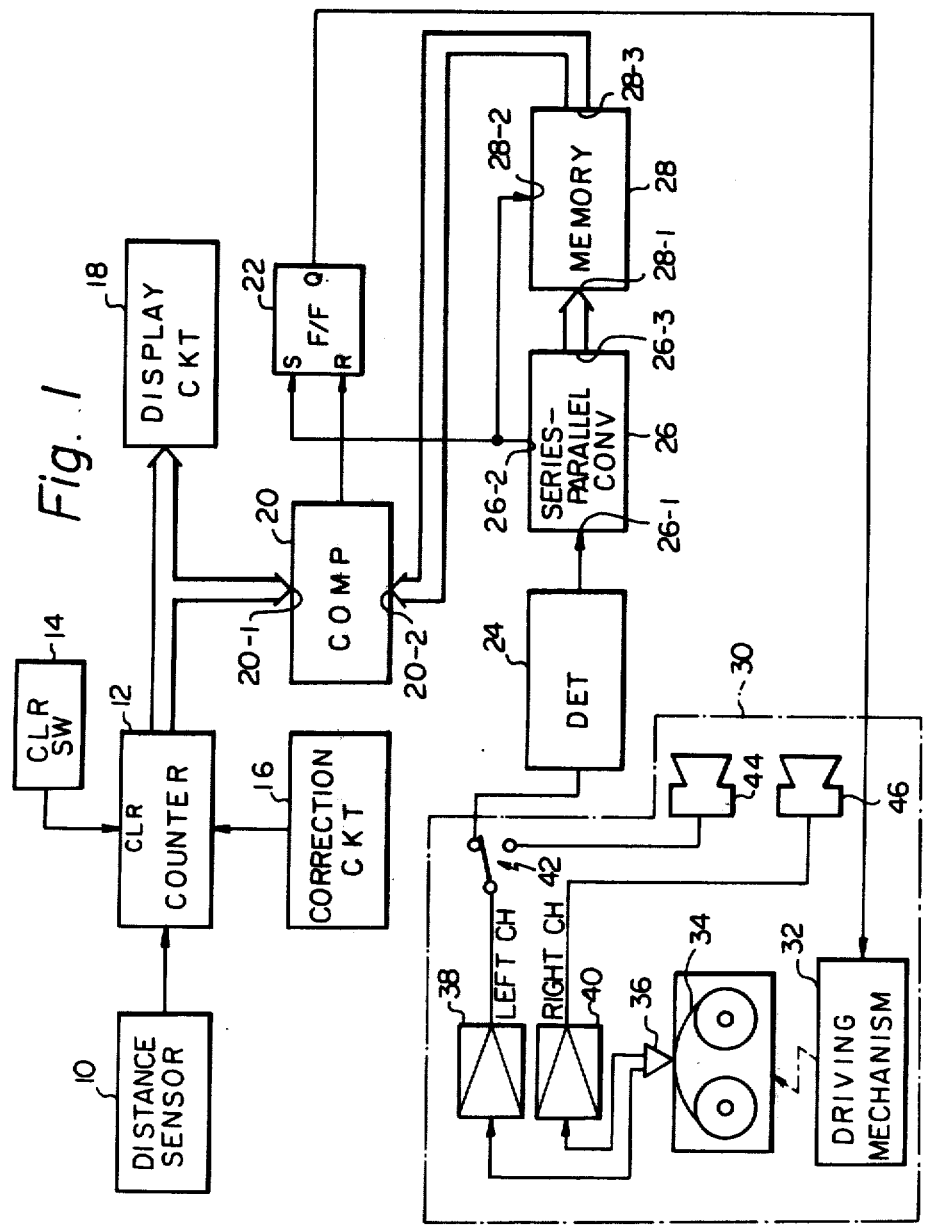
FIG. 1 is a schematic block diagram of a preferred embodiment of a navigational information announcing system according to the present invention.

Referring to FIG. 1, a preferred embodiment of a navigational information announcing system according to the present invention, comprises distance sensor 10, including a pulse generator (not shown) which generates a pulse each time a vehicle on which it is mounted travels a predetermined unit distance. The pulse generator is operatively connected to a drive mechanism for the wheels of the vehicle or the vehicle odometer so as to measure the distance travelled by the vehicle. The output of the distance sensor 10 is connected to an input of a counter 12. The counter 12 is arranged to count the number of the pulses applied to the input thereof and produce an output signal, in the form of a binary coded signal, indicative of the distance travelled. The counter 12 has a clear terminal CLR which is connected to an output of a clear switch 14, and another terminal connected to an output of a correction circuit 16. The clear switch 14, push-button type manual switch, produces a pulse signal when operated. In response to a pulse at the clear terminal CLR the information stored in the counter 12 is cleared (canceled). Counter 12 has a parallel multi-bit binary coded output signal that is connected by a bus to an input of a display circuit 18 which includes a decoder and a display unit such as a seven-segment display device (neither is shown). The function of the correction circuit 16 is discussed infra.

The multi-bit output of the counter 12 is connected by a bus to a first input 20-1 of a digital comparator 20, having a second multi-bit input 20-2 responsive to a bus and an output. The output of the digital comparator 20 is connected to a reset terminal R of a flip-flop 22, having an output connected to a tape driving mechanism 32 included in a tape player 30.

The tape player 30 includes the above mentioned tape driving mechanism 32, a reproduce head 36, first and second amplifiers 38 and 40, and first and second speakers 44 and 46. The tape player 30 is of a stereophonic type and thus the reproduce head 36 actually has two heads to reproduce two signals for left and right channels. The outputs of the reproduce head 36 are respectively connected to the inputs of the first and second amplifiers 38 and 40. The output of the second amplifier 40 is directly connected to the second speaker 46, while the output of the first amplifier 38 is connected via a single pole double-throw switch 42 to first speaker 44. The single pole double-throw switch 42 has a movable lever connected to the output of the first amplifier 38, and first and second stationary contacts respectively connected to the first speaker 44 and an input of a detector 24. The tape driving mechanism 32 of the tape player 30 is arranged to perform a pause operation when a high level signal is applied to the input thereof and perform a normal playback (reproduce) operation when a low level signal is applied to the same. It will be understood that if the vehicle is equipped with a tape player system, the tape player may be used. The switch 42 is provided to selectively connect the output of the first amplifier 38 to either the first speaker 44 or the input of the detector 24. When the first speaker 44 is connected to the first amplifier 38, the tape player 30 is used as a regular stereophonic system to reproduce stereophonic audio signals such as music. On the contrary, when the first amplifier 38 is connected to the detector 24, the tape player 30 is used to supply distance information to the detector 24. In other words, when it is desired to operate the navigational announcing system, the movable lever of the switch 42 is turned to the position as shown in FIG. 1. The first amplifier 38 and the first speaker 44 are of the left channel, while the second amplifier 40 and the second speaker 46 are of the right channel.

It is assumed that magnetic tape 34, which is shown as a cassette tape, is pre-recorded with distance and directional information. The distance information is pre-recorded on the left channel, while the directional information is pre-recorded on the right channel. The distance information is recorded in the form of a binary coded signal, while the directional information is recorded in the form of oral messages. The method of recording these pieces of information into magnetic tape 34 is described infra.

The detector 24 includes a rectifier which produces pulse signals in response to reproduced alternating currents. The output of the detector 24 is connected to an input 26-1 of a series-parallel converter 26 which has first and second output terminals 26-2 and 26-3. The first output 26-2 of the converter 26 is connected to a control terminal 28-2 of a memory 28, while the second output 26-3 of the converter is a multi-bit binary signal connected via a bus to an input 28-1 of the memory 28. The first output 26-2 of the series-parallel converter 26 is further connected to set terminal S of the flip-flop 22. The output of the memory 28 is connected to the second input 20-2 of the digital comparator 20.

Figure 2:
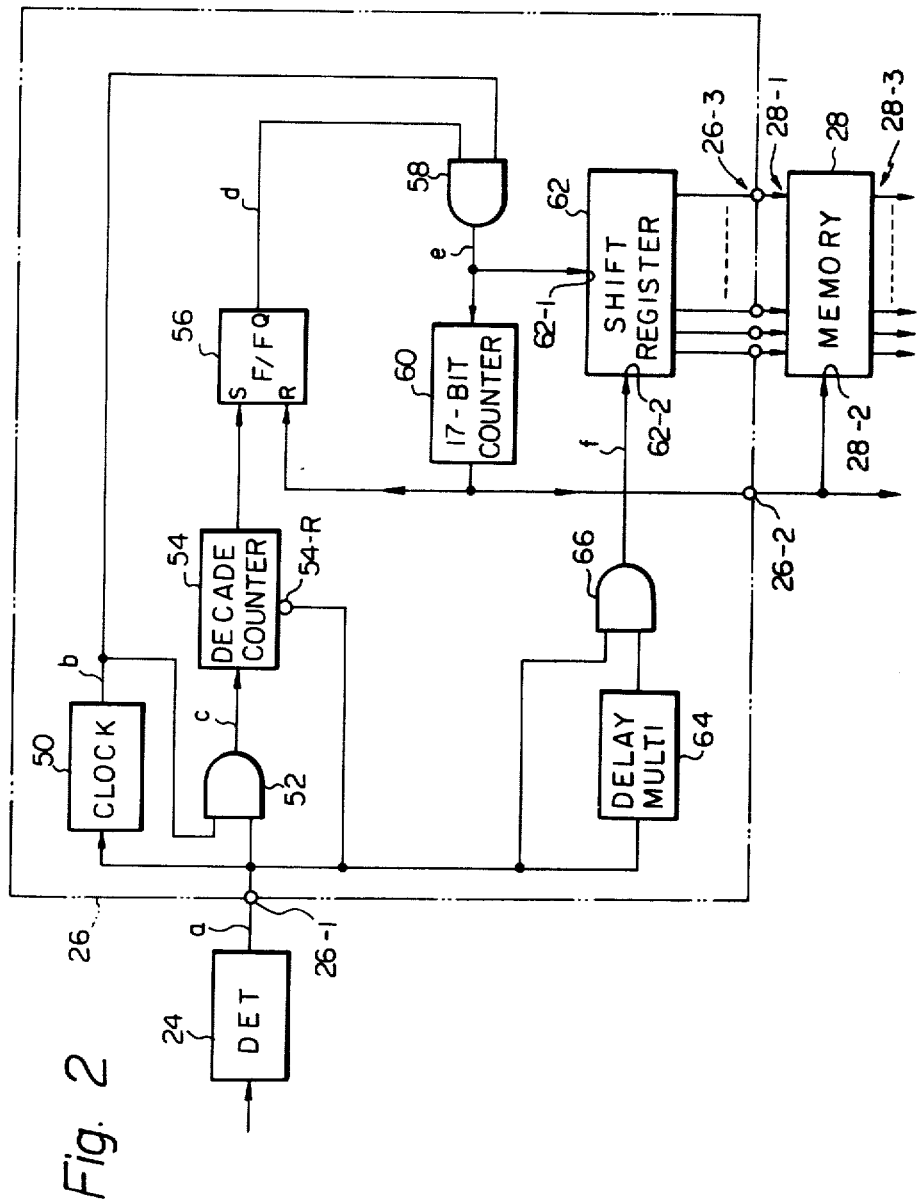
FIG. 2 is a schematic block diagram of a series-parallel converter shown in FIG. 1.

FIG. 2 is an illustration of a detailed circuit diagram of the series-parallel converter 26 shown in FIG. 1 as well as the connection between the converter 26 and detector 24 and the connection between the converter 26 and the memory 28. The series-parallel converter 26 includes a clock pulse generator 50, a first AND gate 52, a decade counter 54, a flip-flop 56, a second AND gate 58, a 17-bit counter 60, a shift register 62, a delay multivibrator 64, and a third AND gate 66. The input 26-1 which is connected to the output of the detector 24 is connected to an input of the first AND gate 52, to an input of the clock pulse generator 50, to a reset terminal 54-R of the decade counter, and to an input of the delay multivibrator 64. The first AND gate 52 has another input connected to the output of the clock pulse generator 50 and the output of the first AND gate is connected to an input of the decade counter 54. The output of the clock pulse generator 50 is further connected to an input of the second AND gate 58. The output of the decade counter 54 is connected to a set terminal S of the flip-flop 56, the output Q of which is connected to the other input of the second AND gate 58. The output of the second AND gate 58 is connected to an input of the 17-bit counter 60, the output of which is connected to the reset terminal R of the flip-flop 56. The output of the second AND gate 58 is further connected to a control terminal 62-1 of the shift register 62 which has an input terminal 62-2 connected to the output of the third AND gate 66. The third AND gate 66 has two inputs respectively connected to the output of the delay multi-vibrator 64 and the output of the detector 24. The output of the 17-bit counter 60 is further connected to a first output 26-2 of the series-parallel converter 26. The second output 26-3 (actually a plurality of outputs) of the shift register 62 is connected to the input 28-1 of the memory 28. It will be understood that the bus shown between the series-parallel converter 26 and the memory 28 in FIG. 1 corresponds to the plural wires shown between them in FIG. 2.

The operation and function of the navigational announcing system shown in FIG. 1 are described hereinafter. It is assumed that the normal playback key (not shown) of the tape player 30 is operated to reel the magnetic tape 34 when a vehicle starts from a starting point. Two data signals are respectively pre-recorded on the left and right channels of the magnetic tape 34.

FIG. 3 includes illustrations of waveforms of the first and second data signal which respectively contain distance information and directional information. The movable lever of the double-throw switch 42 is in contact with the second stationary contact as shown, and thus the left channel signal, i.e. the distance information, is transmitted to the input of the detector 24. While the reproduce head 36 is scanning the tape portion on which the distance information is pre-recorded, no audio signal is emitted from the speaker 26 since no oral information is pre-recorded on the corresponding portion of the right channel.

The distance information is pre-recorded in the form of a 17 bit binary coded signal preceded by one bit blank, designated by a reference "A"; reference A occurs immediately after 10-bit marker signal, as illustrated in FIG. 4(a). The sixteen bits which follow the one bit blank A represent the net distance information, each digit of the decimal number corresponding to the distance is indicated by four bits, whereby distance is indicated by a binary coded decimal signal. As shown, four digits, such as from 100 Km to 0.1 Km, are arranged in series by four bits. Assuming that the high and low levels of the pulse signal from the detector 24 are respectively referred to as logic "1" and "0", each of the digits of the distance is coded as follows.

| 100 ~ 900 Km | 0001 ~ 1010 |
| 10 ~ 90 Km | 0001 ~ 1010 |
| 1 ~ 9 Km | 0001 ~ 1010 |
| 0.1 ~ 0.9 Km | 0001 ~ 1010 |

It is to be understood that the distance information expressed by the waveform of FIG. 4(a), having a hundreds digit represented by 0001, a tens digit by 0100, a units digit by 0111 and a tenths digit by 0100, represents the decimal value 127.5 Km, i.e. $100+20+7+0.5$.

The clock pulse generator 50 produces clock pulses as shown by the waveform of FIG. 4(b). The frequency of the clock pulses is predetermined so as to correspond to the binary signal from the detector 24. Since the tape reeling speed of the tape player 30 is apt to change because of various conditions, it is preferable to produce the clock pulses in synchronization with the output signal from the detector 24. In the embodiment shown in FIG. 2, the clock pulse generator 50 is triggered to produce a train of synchronous pulses. The pulse width of each of the clock pulses is so narrow that each clock pulse is derived during a period of time corresponding to each bit of the output signal from the detector 24.

The first AND gate 52 is enabled to transmit the clock pulses only when the output signal of the detector 24 assumes a high level. The pulse waveform of FIG. 4(c) represents the output signal of the first AND gate 52. When the marker signal which corresponds to a ten-bit distance is reproduced, ten clock pulses are transmitted via the first AND gate 52 to the decade counter 54. The decade counter 54 produces a carry signal when the number of the pulses applied thereto reaches ten. The decade counter 52 is reset to zero by a low level signal applied to the reset terminal 54-R from the output of the detector 24. The carry signal from the decade counter 54 is supplied to the set terminal S of the flip-flop 56 so as to set the same, at which time the output signal of the flip-flop 56 turns high to enable the second AND gate 58. The output signals of flip-flop 56 and AND gate are respectively shown by the waveforms of FIGS. 4(d) and 4(e).

The second AND gate 58 permits the transmission of the clock pulses from the clock pulse generator 50 as long as the second AND gate 58 is enabled. The clock pulses coupled through the second AND gate 58 are applied to the 17-bit counter 60, which produces an output carry signal when the number of the pulses applied thereto equals seventeen. The carry signal is applied to the reset terminal R of the flip-flop 56 and thus the flip-flop 56 is reset. It will be understood that the output pulses of the second AND gate 58 are applied to the control terminal 62-1 of the shift register 62 to enable the write-in function of the shift register 62. Since seventeen pulses are applied to the control terminal 62-1 continuously, the shift register is enabled seventeen times. Meanwhile, the output signal of the detector 24 is applied to the input of the delay multivibrator 64 and to an input of the third AND gate 66. The delay multivibrator 64 includes a monostable multivibrator triggered by a trailing edge of an input pulse to produce a high level output signal for a predetermined period of time. The predetermined period of time is set by selecting the time constant of the monostable multivibrator 64 and is set to correspond to a period of time of seventeen bits of the output signal of the detector 24. The high level output signal of the delay multivibrator 64 is supplied to the other input of the third AND gate 66 to enable the same.

At the end of the marker signal, i.e. in response to the trailing edge of the marker signal, the delay multivibrator 64 produces a high level signal which continuously assumes a high level for a period of time of seventeen bits. The third AND gate 66 is thus enabled to permit the transmission of the pulses from the detector 24. The waveform FIG. 4(f) represents the output pulses of the third AND gate 66. With this provision, the pulses indicative of the distance information are transmitted to the input 62-2 of the shift register 62 but the marker signal is decoupled from input 62-2.

Since the shift register 62 is enabled each time a pulse is applied from the second AND gate 58 to the control terminal 62-1, the pulses indicative of the distance are serially stored in the shift register 62. When all of the bit signals applied from the third AND gate 66 are stored in the shift register 62, the 17-bit counter 60 produces the aforementioned carry signal which is applied to the control terminal 28-2 of the memory 28. At this instant, the data, i.e. the bit signals, stored in the shift register 62 are simultaneously read out to be transferred into the memory 28. In other words, the bit signals which are serially stored in the shift register 62 with respect to time are stored in the memory in parallel. The carry signal from the 17-bit counter 60 is transmitted to the set terminal S of the flip-flop 22 shown in FIG. 1, while the multi-bit output signal of the memory 28 is applied to the second input 20-2 of the digital comparator 20.

In response to the carry signal from the 17-bit counter 60, as derived from output 26-2, the flip-flop 22 is set to produce a high level output signal which is applied to the tape driving mechanism 32. Consequently, in response to the trailing edge of the sixteenth bit of the distance information, the tape reeling is stopped, viz. a pause is made.

As the vehicle travels, the counter 12 counts the number of pulses derived from the distance sensor 10 to produce an output signal indicative of the distance travelled. This distance is visually displayed by the display circuit 18 so that the vehicle driver may ascertain the distance readily. The output signal of the counter 12 is applied to the first input 20-1 of the digital comparator 20 so that the distance actually travelled by the vehicle is compared with the distance indicated by the memory output signal applied to the second input 20-2 of the digital comparator 20. The comparator 20 produces an output pulse signal when the distance actually travelled equals the distance reproduced from the magnetic tape 34 and is applied via the memory 28.

When the high level signal from the digital comparator 20 is applied to the reset terminal R of the flip-flop 22, the flip-flop 22 is reset so that the output signal of the flip-flop 22 turns low. In response to the low level signal from the flip-flop 22 the tape driving mechanism 32 re-establishes the normal playback operation from the pause operation. The tape 34 is reeled at the normal playback speed and thus the data on the right channel (see FIG. 3) are reproduced. This means that the directional information pre-recorded in the form of audio signals is reproduced and the oral information is emitted from the right channel speaker 46. The vehicle driver listens to the reproduced oral information. The oral information may instruct the driver to make a turn in a predetermined direction.

After the oral information is announced, the tape 34 is reeled as far as the presence of the next marker signal. At the end of ten bit pulses of the next marker signal the tape driving mechanism 32 performs a pause operation in the same manner as in the case of the first marker signal. The second distance information for a second point of the predetermined course is then applied to the digital comparator 20 to be compared with the distance actually travelled. The second oral information is announced when the vehicle travels the distance contained in the second information. The announced second oral information supplies the vehicle driver with information in connection with the second point. The two kinds of information, i.e. the distance information on the left channel and the oral information on the right channel, are alternately reproduced along the predetermined course so that a plurality of pieces of oral information is announced in turn.

When it is difficult to find which way to go with only simple directional instructions, it is preferable to give the driver not only the direction of a turn to be made but also other information telling the features of the intersection. For instance, at an intersection of a five-forked road it is advantageous if the information contains the name of a building, if there is one, at the corner of the intersection where a turn is to be made.

The oral information may further indicate the distance to a specific guide point along the predetermined course from the starting point. The distance information applied to the driver may be used to check if the distance displayed at the display circuit 18 is correct or not. The distance displayed by the display circuit 18 may be erroneous due to the change in the diameter of wheels of the vehicle. When it is found that there is difference between the displayed distance and the distance reproduced from the magnetic tape 34, it is preferable to correct the information stored in the counter 12 so that the measurement of the distance along the remaining legs of the predetermined course may be more accurate. The circuit 16 corrects the stored information. The correction circuit 16 may include a keyboard which is operated by the vehicle driver. The driver sets the correct distance in accordance with the reproduced information by using a keyboard. The distance set in by the keyboard is encoded by a suitable encoder into a binary coded signal to be applied to the counter 12. The counter 12 is reset with the correct distance and counts up the number of the pulses from the distance sensor 10 from the value of the correct distance.

Although the oral information is described as supplying the vehicle driver with directional and/or distance information hereinabove, the oral information may contain a guide to places of scenic and historic interest, telling all the detailed features of each sight seeing place and the history thereof. The driver as well as other passengers of the vehicle may obtain a significant amount of spoken information along the predetermined course, as might otherwise be obtained by reading a guide book. Therefore, the passengers can enjoy the travel much more than if they had no information.

In the above described discussion of the navigational information announcing system according to the present invention, it is assumed that a specific magnetic tape on which distance information in the form of a binary coded signal and oral information such as directional information are respectively pre-recorded, is used.

The information can be recorded into a magnetic tape by using various methods. In one method, the information recording may be performed without travelling a predetermined course. Necessary distances along the predetermined course may be obtained from a suitable map and the distance information may be recorded in the form of binary coded signals into the left channel of a magnetic tape. A suitable keyboard and an encoder are provided to encode various distances into binary coded signals. These binary coded signals are recorded on a magnetic tape via a suitable parallel to series converter, an amplifier and a record head. After the distance information has been recorded in the left channel, oral information may be recorded via a suitable microphone by usual tape recording method onto the right channel.

On the other hand, if it is desired to record distance and oral information by actually travelling along a predetermined course, the output signal of the counter 12 shown in FIG. 1 may be used to provide the distance information to be recorded. The output signal, in the form of a binary coded signal, is recorded on a magnetic tape via like parallel to series converter, an amplifier and a record head. The oral information may be recorded in the same manner as in the above described case.

In the preferred embodiment, the binary coded distance information signals and the oral information which may include directional instructions are respectively recorded onto the left and right channels of a magnetic tape. However, these two kinds of information may be recorded on the same channel, i.e. on the same track alternately. In this case, a monoral tape player may be used.

Although the navigational information announcing system according to the present invention comprises discrete elements as shown in FIG. 1 and FIG. 2, the heart of the system may be reduced by a microcomputer.

What is claimed is:

1. A navigational information announcing system for a motor vehicle comprising:
    (a) first means for producing a first signal indicative of a measured distance travelled by a motor vehicle;
    (b) a tape player for reproducing first and second data respectively pre-recorded on a magnetic tape, said tape player including a tape driving mechanism, said first datum including plural pieces of distance information along a predetermined course, said second datum including plural pieces of navigational information in audio form;
    (c) second means responsive to said first datum, said second means producing a second signal upon termination of reproduction of one of said plural pieces of distance information and a third signal indicative of a reference distance expressed by said one piece of distance information;
    (d) third means for producing a fourth signal when said measured distance indicated by said first signal has a predetermined relationship with respect to said reference distance indicated by said third signal;
    (e) fourth means for controlling said tape driving mechanism of said tape player, said fourth means causing said tape driving mechanism to establish a pause operation in response to said second signal and to re-establish a normal playback operation in response to said fourth signal so as to reproduce one of said pieces of navigational information;
said second means comprising:
    (a) a detector responsive to said first datum which is pre-recorded in the form of binary coded data;
    (b) a series-parallel converter responsive to the output data of said detector, said series-parallel converter producing a binary coded datum in parallel form, said series-parallel converter producing a memory control signal when series-parallel conversion of a predetermined number of bits is completed; and
    (c) a memory responsive to the output data of said series-parallel converter, said data being stored in response to said memory control signal.

2. A navigational information announcing system as claimed in claim 1, wherein said third means comprises a digital comparator responsive to said first signal and to said output signal of said memory, said digital comparator producing an output signal when two distances indicated by the input signals are equal to each other.

3. A navigational information announcing system as claimed in claim 2, wherein said fourth means comprises a binary circuit responsive to said memory control signal and to said output signal of said digital comparator.

4. A navigational information announcing system as claimed in claim 1, wherein said series-parallel converter comprises:
(a) a clock pulse generator;
(b) a first AND gate responsive to the output data of said detector and to clock pulses from said clock pulse generator;
(c) a first counter responsive to the output signal of said first AND gate for producing an output signal when the number of pulses equal a predetermined value, said counter being reset to zero periodically;
(d) a flip-flop responsive to the output signal of said first counter, to be set;
(e) a second AND gate responsive to the output signal of said flip-flop and to the clock pulses;
(f) a second counter responsive to the output pulses from said second AND gate, said second counter producing an output signal when the number of pulses equals a predetermined value, the output signal of said second counter being fed to said flip-flop to reset the same, said output signal of said second counter being used as said memory control signal;
(g) a shift register responsive to the output pulses of said second AND gate to be enabled;
(h) a monostable multivibrator responsive to the output data of said detector, said monostable multivibrator being triggered with a trailing edge of an input pulse to produce an output pulse signal having a predetermined width; and
(i) a third AND gate responsive to the output data of said detector and to said output pulse signal of said monostable multivibrator, said third AND gate transmitting information data to said shift register.

5. A navigational information announcing system for a motor vehicle comprising:
a distance measuring means for measuring a distance travelled by a motor vehicle;
a tape player with a magnetic tape on which plural pieces of binary coded distance information and plural pieces of audio information are recorded alternately;
a tape control means for advancing said magnetic tape wherein, upon termination of reproduction of one of said plural pieces of binary coded distance information, a pause for said tape player is made and said one piece of binary coded distance information which has been reproduced is stored, and wherein, when said measured distance has a predetermined relationship with said one piece of binary coded distance information stored, said pause is released to permit said tape player to reproduce an adjacent one of said pieces of audio information which is recorded on said magnetic tape immediately after said one piece of binary coded distance information;
each of said plural pieces of binary coded distance information following a marker signal which is recorded on said magnetic tape, said tape control means including a shift register and means for transmitting to said shift register a piece of binary coded distance information that is reproduced by said tape player in response to the end of said marker signal.

6. A navigational information announcing system as claimed in claim 5 wherein said transmitting means includes a delay multivibrator which produces a high level signal at the end of said marker signal, and AND gate means for permitting transmission of said piece of binary coded distance information to said shift register when said high level of said delay multivibrator is present.

7. A navigational information announcing system as claimed in claim 6 wherein said tape control means includes means for producing an output carry signal upon termination of storage of said piece of distance information by said shift register, and memory means responsive to said output carry signal for storing said piece of distance information which has been stored in said shift register.

8. A navigational information announcing system as claimed in claim 7 wherein said tape control means includes a comparator means for comparing said measured distance with said piece of distance information which is stored in said memory means to produce at an output terminal thereof a signal when said measured distance has said predetermined relationship with said piece of distance information, and a flip-flop means having a set terminal connected to receive said output carry signal and a reset terminal connected to receive said signal on said output terminal of said comparator means, said flip-flop means producing a pause signal in response to an occurrence of said carry signal, said flip-flop means producing a pause release signal in response to an occurrence of said signal on said output terminal of said comparator means.

* * * * *